(12) United States Patent
Kennedy (10) Patent No.: US 6,763,014 B2
(45) Date of Patent: Jul. 13, 2004

(54) INTELLIGENT COMMUNICATION NODE OBJECT BEACON FRAMEWORK (ICBF) WITH TEMPORAL TRANSITION NETWORK PROTOCOL (TTNP) IN A MOBILE AD HOC NETWORK

(75) Inventor: Robert A. Kennedy, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 147 days.

(21) Appl. No.: 10/253,227

(22) Filed: Sep. 24, 2002

(65) Prior Publication Data

US 2004/0057409 A1 Mar. 25, 2004

(51) Int. Cl.[7] .................................................. H04Q 7/24
(52) U.S. Cl. ...................................... 370/338; 370/401
(58) Field of Search ......................... 370/254, 351–356, 370/338, 328, 349, 401, 466, 467, 238

(56) References Cited

U.S. PATENT DOCUMENTS

| | | | |
|---|---|---|---|
| 5,412,654 A | 5/1995 | Perkins | 370/94.1 |
| 5,987,011 A * | 11/1999 | Toh | 370/331 |
| 6,304,556 B1 | 10/2001 | Haas | 370/254 |
| 6,385,174 B1 | 5/2002 | Li | 370/252 |
| 6,456,599 B1 * | 9/2002 | Elliott | 370/254 |
| 2001/0033556 A1 | 10/2001 | Krishnamurthy et al. | 370/329 |
| 2003/0081603 A1 * | 5/2003 | Rune | 370/390 |
| 2003/0110291 A1 * | 6/2003 | Chen | 709/244 |
| 2003/0156558 A1 * | 8/2003 | Cromer et al. | 370/331 |
| 2004/0022223 A1 * | 2/2004 | Billhartz | 370/338 |

OTHER PUBLICATIONS

Mirhakkak et al., *Dynamic Quality–of–Service for Mobile Ad Hoc Networks*, MITRE Corp., 2000.
Van Dyck et al., *Distributed Sensor Processing Over an Ad–Hoc Wireless Network: Simulation Framework And Performance Criteria*, Proceedings IEEE Milcom, Oct. 2001.
Zhu, *Medium Access Control and Quality–of–Service for Mobile Ad Hoc Networks*, PHD Thesis, Department of Computer Engineering, University of Maryland, College Park, MD, 2001.
Royer et al., *A Review of Current Routing Protocols for Ad Hoc Mobile Wireless Networks*, IEEE Personal Communications, Apr. 1999, pp. 46–55.
Corson et al., *A Reservation–Based Multicast (RBM) Routing Protocol for Mobile Networks: Initial Route Constructions Phase*, ACM/I. 1, No. 4, 1995, pp. 1–39.
Xiao et al., *A Flexible Quality of Service Model for Mobile Ad Hoc Networks*, IEEE VTC2000–spring, Tokyo, Japan, May 2000.

(List continued on next page.)

*Primary Examiner*—Ajit Patel
(74) *Attorney, Agent, or Firm*—Allen, Dyer, Doppelt, Milbrath & Gilchrist, P.A.

(57) ABSTRACT

The mobile ad hoc network includes a plurality of wireless mobile nodes and a plurality of wireless communication links connecting the nodes together. A method for managing and controlling the discovery and maintenance of routes in the network includes transmitting beacon signals from each mobile node, determining a node or group condition at each mobile node, and varying the beacon signals based upon the determined node/group condition. Route tables are bulit and updated at each mobile node with a first one of proactive and reactive route discovery processes to define routes in the network. The beacon signals are received and node/group condition information is stored at each node. Route stability over time is predicted based upon the node/group condition information, and when predicted route stability reaches a first transition parameter the method switches to a second one of the proactive and reactive route discovery processes.

35 Claims, 3 Drawing Sheets

OTHER PUBLICATIONS

Wu et al., *QoS Support in Mobile Ad Hoc Networks*, Computing Science Department, University of Alberta, (no date available).

Corson et al., *Mobile Ad Hoc Networking (MANET): Routing Protocol Performance Issue and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol* (IERP) for Ad Hoc Networks, Internet Engineering Task Force (IETF) MANET Working Group, Internet Draft, Jun. 2001.

Clausen et al. *Optimized Link State Routing Protocol*, Internet Engineering Task Force (IETF) MANET Working Group, Internet Draft, Oct. 31, 2001.

Perkins et al., *Quality of Service in Ad Hoc On–Demand Distance Vector Routing*, Internet Engineering Task Force (IETF) MANET Working Group, Internet Draft, Jul. 2000.

Park et al., *Temporally–Ordered Routing Algorithm (TORA) Versoin 1 Functional Specification*, Internet Engineering Task Force (IETF) MANET Working Group, Internet Draft, Jul. 20, 2001.

Ogier et al., *Topology Broadcast Based on Reserve–Path Forwarding (TBRPF)*, Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad hoc On–Demand Distance Vector (ADOV) Routing*, Internet Engineering Task Force (IETF) MANET Working Group, Internet Draft, Nov. 9, 2001.

Chakrabarti et al., "*QoS Issues in Ad Hoc Wireless Networks*", , IEEE Communications Magazine, (2/01), pp. 142–148.

Chen, "*Routing Support for Providing Guaranteed End–to–End Quality–of–Service,*" Ph.D. thesis, Univ. of Illinois at Urbana–Champaign, http://cairo.cs.uiuc.edu/papers/Scthesis.ps. 1999.

* cited by examiner

INTELLIGENT COMMUNICATION NODE OBJECT BEACON FRAMEWORK (ICBF) WITH TEMPORAL TRANSITION NETWORK PROTOCOL (TTNP) IN A MOBILE AD HOC NETWORK

FIELD OF THE INVENTION

The present invention relates to the field of communication networks, and, more particularly, to mobile ad hoc wireless networks and related methods.

BACKGROUND OF THE INVENTION

Wireless networks have experienced increased development in the past decade. One of the most rapidly developing areas is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit to or receive from other nodes. The network does not in general depend on a particular node and dynamically adjusts as some nodes join or others leave the network.

In a hostile environment where a fixed communication infrastructure is unreliable or unavailable, such as in a battle field or in a natural disaster area struck by earthquake or hurricane, an ad hoc network can be quickly deployed and provide much needed communications. While the military is still a major driving force behind the development of these networks, ad hoc networks are quickly finding new applications in civilian or commercial areas. Ad hoc networks will allow people to exchange data in the field or in a class room without using any network structure except the one they create by simply turning on their computers or PDAs.

As wireless communication increasingly permeates everyday life, new applications for mobile ad hoc networks will continue to emerge and become an important part of the communication structure. Mobile ad hoc networks pose serious challenges to the designers. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol needs to adapt to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. This way the routing overhead is greatly reduced compared to pro-active protocols which maintain routes to all destinations at all times. It is important for a protocol to be adaptive. Ad Hoc on Demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both proactive and reactive approaches based upon distance from a source node.

These conventional routing protocols use a best effort approach in selecting a route from the source node to the destination node. Typically, the number of hops is the main criteria (metric) in such a best effort approach. In other words, the route with the least amount of hops is selected as the transmission route.

Existing communication node advertisement and communication node neighbor discovery approaches including those for ad hoc networks, only use network-condition-independent mechanisms such as constant transmit rate or random transmit rate "hello" messages from nodes to announce, or advertise, their presence. These transmitted announcements are called "beacons" and under conventional approaches, these beacons are not endowed with any degree of intelligence. Other nodes may detect these beacons and either form a network from scratch or add the newly-detected node to the existing network.

SUMMARY OF THE INVENTION

In view of the foregoing background, it is therefore an object of the present invention to provide the "Intelligent Communication Node Object Beacon Framework" (ICBF), for intelligent, adaptive advertisement by any communications node object of its presence along with the management and control of route discovery and associated processes via temporal transitioning processes and events in a mobile ad hoc network.

This and other objects, features, and advantages in accordance with the present invention are provided by a method for managing and controlling the discovery and maintenance of routes in a mobile ad hoc network. The network includes a plurality of mobile nodes and a plurality of wireless communication links connecting the nodes together. The method includes transmitting beacon signals from each mobile node, determining a node or group condition at each mobile node, and varying the beacon signals based upon the determined node/group condition. Also route tables are bulit and updated at each mobile node with a first one of proactive and reactive route discovery processes to define routes in the network. A route is a set of wireless communication links and mobile nodes from a source to a destination. The beacon signals are received and node/group condition information is stored at each node. Route stability over time is predicted based upon the node/group condition information, and when predicted route stability reaches a first transition parameter the method switches to a second one of the proactive and reactive route discovery processes.

The method preferably includes switching back to the first one of the proactive and reactive route discovery processes when predicted route stability reaches a second transition parameter, and the first and second transition parameters preferably specify time-dependent conditions. Varying the beacon signal may comprise varying at least one of transmission rate, transmission frequency and transmission pattern. Also, the transmission rate of the beacon signal should not exceed a rate threshold based upon available bandwidth.

The node/group condition may include node/group movement, and varying the beacon signal may comprise increasing the transmission rate based upon increased node/group movement and decreasing the transmission rate based upon decreased node/group movement. Node/group movement comprises at least one of node/group velocity, node/group acceleration and node/group movement pattern of the corresponding mobile node or group of mobile nodes. Node/group condition information is based upon node mobility, link failure, link creation, node/group stability and link quality, and storing node/group condition information may comprise creating and updating a time-dependent route stability profile. Furthermore, storing node/group condition information may also include creating and updating a time-dependent route segment stability profile. A segment is a set of links and nodes which define a reusable entity in one or more routes.

A mobile ad hoc network according to the present invention includes a plurality of mobile nodes, and a plurality of wireless communication links connecting the mobile nodes together. Each mobile node include a communications device to wirelessly communicate with other nodes of the plurality of nodes via the wireless communication links, and a controller to route communications via the communications device. The controller has a condition determining unit to determine a condition of the mobile node or group of nodes, and a beacon signal generator to generate and transmit beacon signals. The beacon signal generator varies the beacon signals based upon the determined condition of the mobile node/group.

Route tables define routes in the network. A route is a set of wireless communication links and mobile nodes from a source to a destination. The controller also includes a route discovery module to discover routes and update the route tables with one of a plurality of route discovery processes, a condition module to receive beacon signals and store node/group condition information, a route stability predictor to predict route stability over time based upon the node/group condition information, and a route discovery process selector to select between the plurality of route discovery processes based upon the predicted route stability.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer or other programmable apparatus implemented process such that the instructions which execute on the computer or other programmable apparatus provide steps for implementing the functions specified in the flowchart block or blocks.

Existing node presence advertisement methods (neigbor discovery beacons) supplied by proactive and reactive methods as well as standalone neighbor discovery beacons, do not transmit node movement properties, do not intelligently and in real-time adapt their transmission rates according to how the nodes in the network are moving, and do not advertise the movement and presence of groups of nodes, which could reduce the overhead traffic of such advertisements.

The present invention makes use of the temporal transition network protocol (TTNP) in a mobile ad hoc network to efficiently make use of the management and control of route discovery and associated processes via temporal transitioning processes and events in a mobile ad hoc network, as described in copending application Ser. No. 10/134,856, filed Apr. 29, 2002 by the same assignee of record and incorporated by reference herein in its entirety. Furthermore, the present invention makes use of "Intelligent Communication Node Object Beacon Framework" (ICBF), for intelligent, adaptive advertisement by any communications node object of its presence and/or the corresponding detection (neighbor discovery) by another node object or the network of those node objects transmitting such beacons as described in copending application Ser. No. 10/235,242, filed Sep. 4, 2002 by the same assignee of record and incorporated by reference herein in its entirety.

Figure 1:
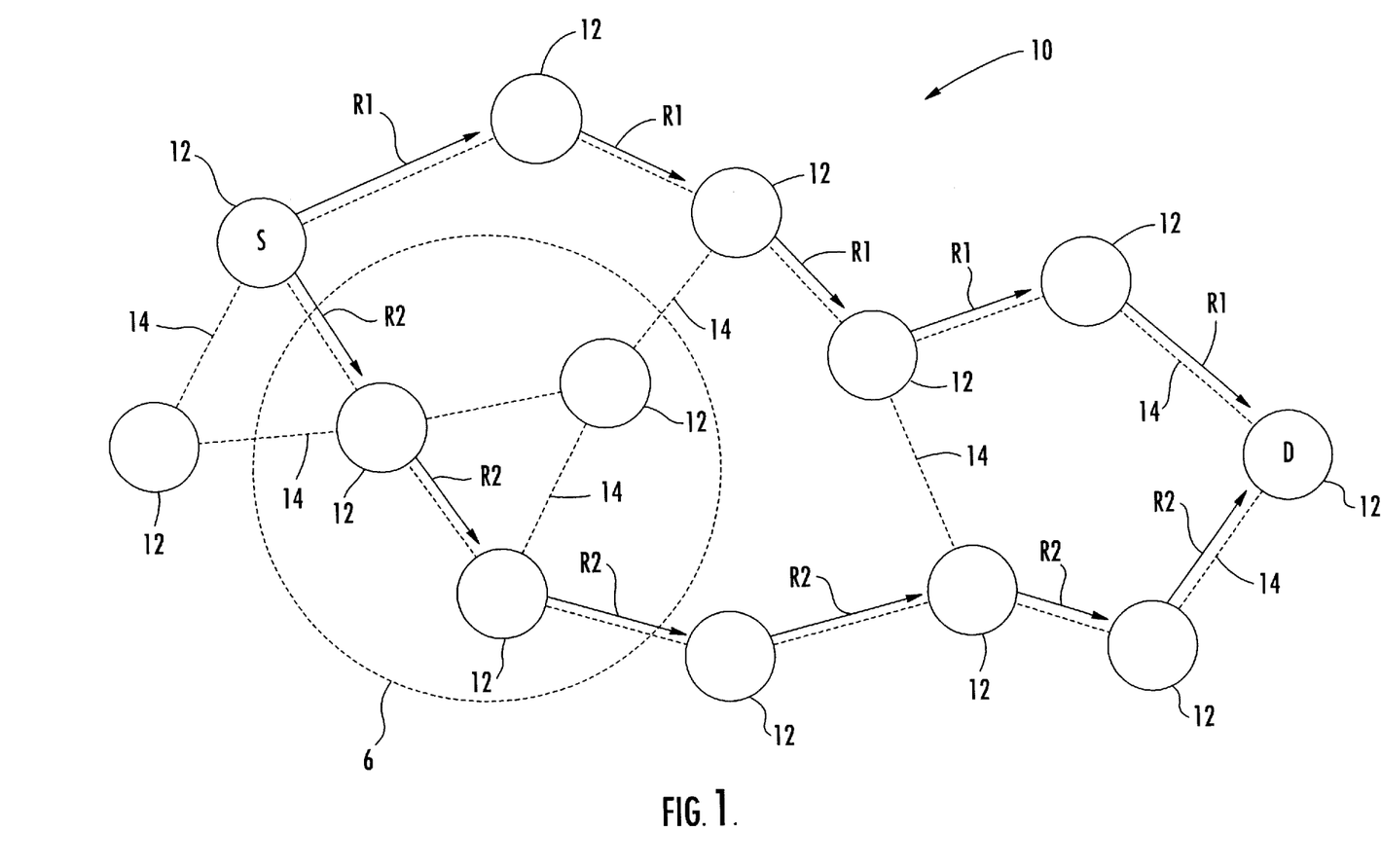
FIG. 1 is a schematic diagram of a mobile ad hoc network in accordance with the present invention.
Figure 2:
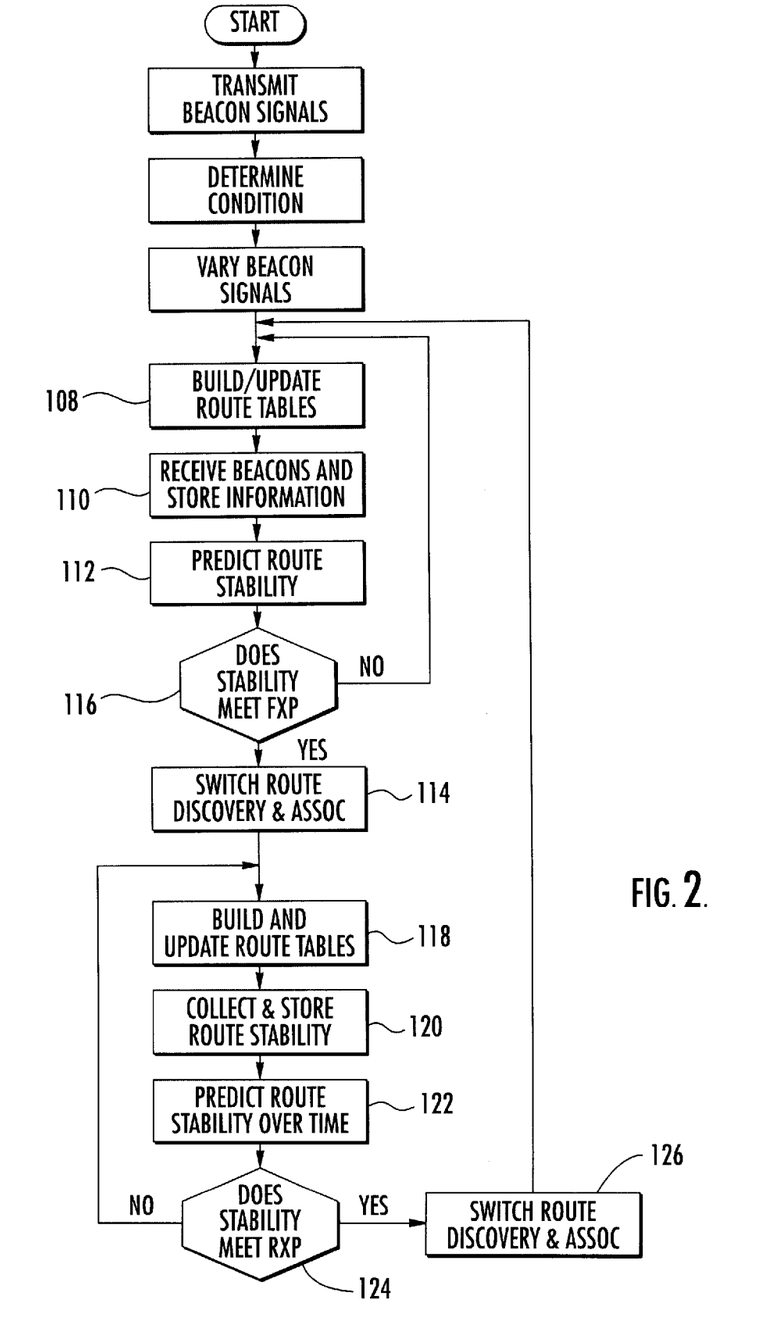
FIG. 2 is a flowchart illustrating the steps of a method for managing and controlling the discovery and maintenance of routes in accordance with the present invention.

Referring initially to FIGS. 1 and 2, a method for discovering routes from a source node to a destination node in a mobile ad hoc network 10 will now be described. The network 10 includes a plurality of mobile nodes 12 including the source node S and the destination node D with intermediate nodes therebetween. The nodes 12, such as laptop computers, personal digital assistants (PDAs) or mobile phones, are connected by wireless communication links 14 as would be appreciated by the skilled artisan. The Temporal Transition Network Protocol (TTNP) temporally combines, controls and manages both proactive and reactive approaches (and/or other route discovery approaches) in any network architecture whether it is flat or structured such as in a hierarchical network.

TTNP provides the protocol suite and transition parameters for supporting the switching back and forth between a plurality of route discovery approaches, e.g. any proactive and reactive network route discovery approaches, during the time-ordered evolution of the network 10. The protocol suite supports not only the transition parameters (quantities that signal TTNP to start the transition from a proactive to a reactive approach and vice versa) defined herein, but can also support other transition parameters defined by a system designer. TTNP will carry the negotiations between various subsets of nodes 12 and links 14 in the network 10 and interact with Quality of Service (QoS) and traffic management (which includes Admission Control, scheduling, buffer management and flow control), power management & control, security and any other network service components either internal or external to TTNP to gather the information needed to provide this support.

The Intelligent Communication Node Object Beacon Framework" (ICBF) defines temporary or permanent associations of nodes, potentially capable of communication with other temporary or permanent associations of nodes, as "Node Communication Object Association" (NCOA) and the corresponding beacons for this association as "NCOA beacons". In the network 10 shown in FIG. 1, a group G (NCOA) of mobile nodes 12 includes a temporary or permanent association of more than one of the plurality of mobile nodes.

The method begins (FIG. 2; block 100) and includes transmitting beacon signals from each mobile node 102, determining a node or group condition at each mobile node 104, and varying the beacon signals based upon the determined node/group condition 106. The method also includes building and updating route tables (block 108) at each node 12 with either a proactive or a reactive route discovery protocol/process to define routes in the network, i.e. build and maintain valid routes. A route is a set of links and nodes from a source to a destination. As discussed above, many routing protocols are reactive (on-demand) protocols as they collect routing information only when necessary and to destinations they need routes to, and do not maintain unused routes. This way the routing overhead is greatly reduced compared to proactive protocols which maintain routes to all destinations at all times. Ad Hoc on Demand Distance Vector (AODV), Dynamic Source Routing (DSR) and Temporally Ordered Routing Algorithm (TORA) are examples of reactive routing protocols. Examples of proactive routing protocols include Destination Sequenced Distance-Vector (DSDV) routing, Wireless Routing Protocol (WRP) and Optimal Link State Routing (OSLR).

The method also includes receiving the beacon signals and storing node condition information at each node (block 110). Route stability is predicted or estimated or tracked over time based upon the node condition information (block 112), and, at block 114, the method switches to a second one of the proactive and reactive route discovery and their associated processes when predicted route stability reaches a first transition parameter (block 116). Of course, building and updating route tables (block 118), storing information at each node (block 120), and predicting/estimating/tracking route stability over time (block 122) would be then be performed under the switched-to route discovery and process. Moreover, the method preferably includes, at block 126, switching back to the first one of the proactive and reactive route discovery and their associated processes when predicted route stability reaches a second transition parameter (block 124).

The beacon signals include information relating to a condition of the corresponding mobile node or group of nodes. Also, the beacon signals may include information relating to a condition of the mobile ad hoc network 10, such as information about the status of the links 14 between the nodes 12 of the network. Transmitting beacon signals may further include transmitting beacon signal information using a beacon properties signal to advertise a type of beacon signal being transmitted to the plurality of nodes 12 of the mobile ad hoc network 10.

The beacon signal is preferably made up of transmission rate, transmission frequency and transmission pattern which collectively define the beacon waveform. Also, the condition preferably includes node/group movement, such as velocity, acceleration and/or movement pattern of the corresponding mobile node 12 or group of mobile nodes (NCOA) G. Here, varying the beacon signals includes increasing the transmission rate based upon increased node movement and decreasing the transmission rate based upon decreased node movement. The node movement may be determined using global positioning satellites (GPS), local landmarks, triangulation, and/or by measuring inertia of the mobile node 12.

The condition may also or alternatively include priority of information and/or quality of service measurements (QoS), such as bit/packet error rate and/or usable available bandwidth. Here, varying the beacon signals may include increasing the transmission rate and/or changing the transmission frequency or pattern based upon decreased QoS or increased priority of information. Likewise, varying the beacon signals may include decreasing the transmission rate and/or changing the transmission frequency or pattern based upon increased QoS or decreased priority of information. The transmission rate of the beacon signals should not exceed a rate threshold based upon available bandwidth. Group beacon signals are transmitted by a subset of mobile nodes 12 of the group G of mobile nodes 12. Such a subset includes a range from one mobile node 12 to all the mobile nodes 12 of the group G. The maximum would be all the mobile nodes 12 of the group G, while the minimum would be only one node 12 of the group G transmitting the beacons.

The first and second transition parameters preferably specify time-dependent conditions which may include thresholds, for example thresholds based upon a rate of change of source-destination subset pairs for at least one source node, as is discussed in detail below. A Source Destination Subset (SDS) is the allowed subset of possible destination nodes for the designated source node. The limiting case is the entire network. A notable special case is a formal subnet. The node or group condition information may be based upon node mobility, link failure, link creation or other quantities or qualities that could affect the time-dependent stability of a route.

The Forward Transition Parameter (FXP) is the parameter that is used to specify when to switch (transition) from using the route discovery approach category (i.e., proactive or reactive) that the full network or a formally-designated subset of nodes was initialized with, to a different route discovery category. The Reverse Transition Parameter (RXP) is the parameter that is used to specify when to switch (transition) from using the current, but not initial, route discovery approach category that the full network or a formally-designated subset of nodes is using to that approach with which the network/subset of nodes was initialized.

Furthermore, collecting and storing node or group condition information (block 110) may include creating and updating a time-dependent route stability profile and/or a time-dependent route segment stability profile. A route segment (RS) is a set of links and nodes, with some commonality, grouped together to form a reusable entity in potentially more than one route. A route segment would include at least one link and one node. Nothing in the definition requires these links to be spatially contiguous or the nodes to be adjacent to (within 1 hop of) at least one other node in the RS. A spacially contiguous pair of links is defined as two links separated only by a single node connecting both links in a network diagram.

A TTNP Default Pool (TDP) contains the internal default objects for capabilities such as QoS, traffic management, link decay profiles, route maintenance, etc. that TTNP will use to accomplish its switching from proactive to reactive and vice versa in the event that such a capability is required by TTNP but not supplied by some other avenue such as via the application or route discovery technique.

Figure 3:
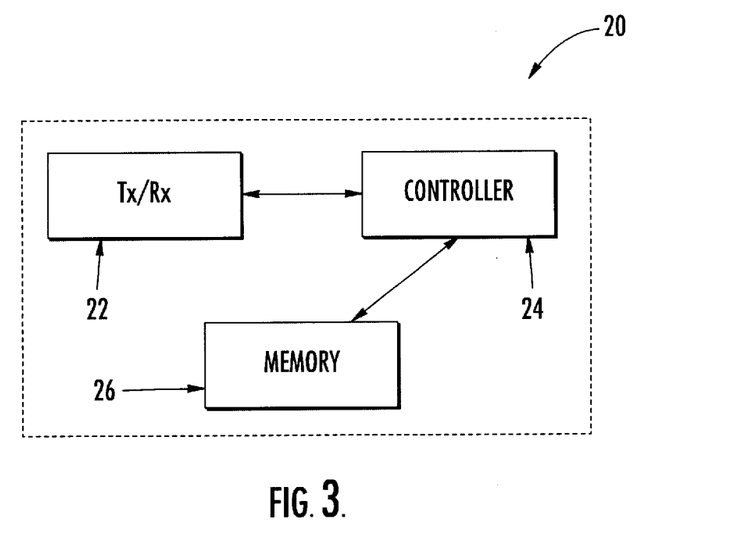
FIG. 3 is a schematic diagram illustrating a router of a node in accordance with the network of the present invention.
Figure 4:
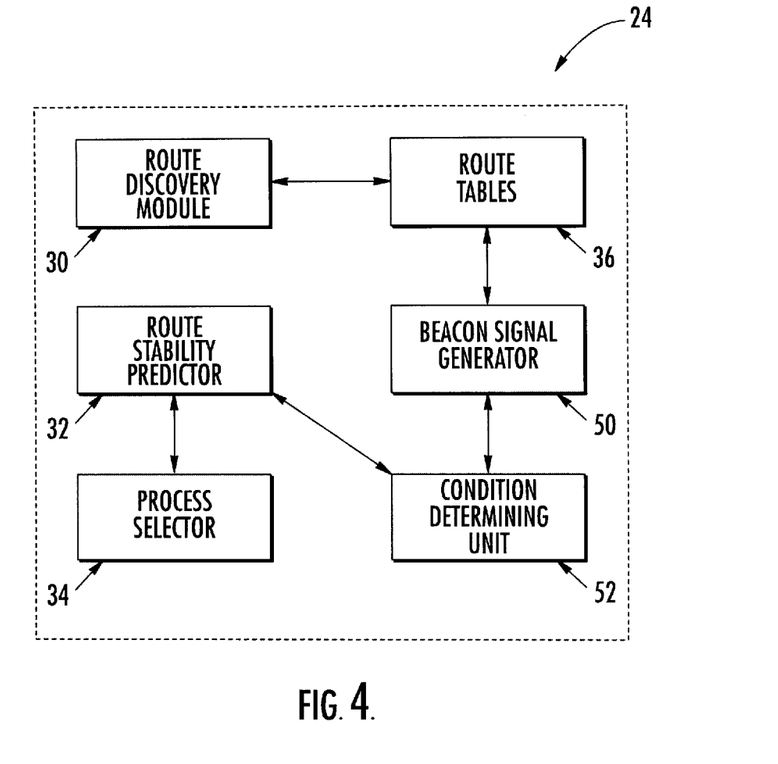
FIG. 4 is a schematic diagram illustrating the details of the controller of the router in FIG. 3.

A system aspect of the invention will now be described with further reference to FIGS. 3 and 4. As discussed, the mobile ad hoc network 10 has a plurality of wireless mobile nodes 12, and a plurality of wireless communication links 14 connecting the nodes together. Each mobile node 12 includes a router 20 that has a communications device 22 to wirelessly communicate with other nodes of the plurality of nodes via the wireless communication links 14. Also, the router includes a controller 24 to route communications via the communications device 22. Also, a memory 26 may be included as part of the controller 24 or in connection with the controller.

The controller 24 includes route tables 36 to define routes in the network 10. Again, a route is a set of links 14 and nodes 12 from a source to a destination. The controller 24 also includes a route discovery module 30 to discover routes and update the route tables 36 with either a proactive or a reactive route discovery process. The controller also includes a beacon signal generator 50 to generate and transmit beacon signals, and a condition determining unit 52 to determine a condition of the mobile node 12. The beacon signal generator 50 varies the beacon signals based upon the determined condition of the mobile node 12. Again, the beacon signals include information relating to a condition of the mobile node 12. The beacon signals may further include information relating to a status of a group G of mobile nodes 12 which, as discussed above, are a temporary or permanent association of at least two of the plurality of mobile nodes 12.

Here, the condition determining unit 52 further determines a condition of the group G of mobile nodes 12, and the beacon signal generator 50 varies the beacon signals based upon the determined condition of the group G of mobile nodes 12. Again, the beacon signal is made up of transmission rate, transmission frequency and transmission pattern.

The node/group condition may include node/group movement, and the beacon signal generator 50 may vary the beacon signals by increasing the transmission rate or changing the transmission frequency or pattern based upon increased node/group movement and decreasing the transmission rate or changing the transmission frequency or pattern based upon decreased node/group movement. The node/group movement includes node/group velocity, node/group acceleration and/or node/group movement pattern of the corresponding mobile node 12 or group G of nodes. The condition determining unit 52 may comprise a global positioning satellite (GPS) device for determining the node/group movement, and/or may determine the node/group movement using local landmarks, by tracking the relative velocity using triangulation and/or by measuring inertia of the mobile node 12 or group of nodes G.

Furthermore, the node/group condition may include quality of service (QoS) and/or priority of information, and the beacon signal generator 50 varies the beacon signals by increasing the transmission rate and/or changing the transmission frequency or pattern based upon decreased QoS or increased priority of information and decreasing the transmission rate or changing the transmission frequency or pattern based upon increased QoS and/or decreased priority of information. The beacon signal generator 50 should not increase the transmission rate of the beacon signals beyond a rate threshold based upon available bandwidth. Again, the beacon signals may also include information relating to a condition of the mobile ad hoc network 10, such as information about the links 14 connecting the nodes 12 of the network. Additionally, the beacon signal generator 50 may transmit beacon signal information using a beacon properties signal to advertise a type of beacon signal being transmitted to the plurality of nodes 12 of the mobile ad hoc network 10.

A route stability predictor 32 predicts or estimates or tracks route stability over time based upon the node or group condition information, and a route discovery process selector 34 selects between the proactive and reactive route discovery processes based upon the predicted route stability. Again, it should be understood that blocks of the illustrations, and combinations of blocks in the illustrations, can be implemented by computer program instructions which may be provided to a processor to implement the functions specified in the block or blocks.

In sum, the network 10 would initially use either a proactive (e.g. OLSR, basic link state, TBRPF) or a reactive (e.g. DSR, AODV) protocol to discover and maintain routes between source S and destination D pairs in order to build the initial route table at that source node. It is possible that at the network's creation, route tables for some or all of the nodes 12 may be initialized by predefining a set of routes for each route table knowing that those routes may change over time. As time moves forward, the network topology will generally change through node mobility and link failures/creation. TTNP accounts for these dynamic topological changes in one or more transition parameters such that when some subset of these parameters reached a certain transition level, a switching (transition) would occur from using proactive route discovery to using reactive route discovery or vice versa. This transition could occur over the entire network or be confined to any portion of it as defined by TTNP profiles.

Note that whenever a route discovery approach transition occurs, TTNP preferably automatically transitions other functionality associated with the route discovery approach such as route maintenance. One unique capability of TTNP is that it mitigates the selection of redundant or similar supporting functionality such as route maintenance or QoS in the event of conflicts between using what is supplied by the route discovery approach (proactive or reactive) and what is supplied by some other "plug-in" from, for example, a third party or from the TTNP default pool.

TTNP will properly operate in either of its two most fundamental cases. First, the initial network state begins using a proactive route discovery process and then upon reaching the threshold value of an applicable forward transition parameter (FXP), the network 10 transitions to using its companion on-demand/reactive route discovery process. Transition from this state of using an on-demand route discovery process back to using a proactive route discovery process occurs when a relevant reverse transition parameter (RXP) threshold has been reached. This RXP may or may not be the same parameter as the FXP, but even if it is, the value assigned to the RXP may not be the same as the FXP value. The key principal to remember for both FXP and RXP is that these parameters are either time itself or some other parameters which have some type of time-dependent relationship defined for describing the dynamics (actual, estimated or predicted) of these parameters.

Note that TTNP does not require any specific approach within a category (proactive or reactive) to use. For example, the application or systems designer may decide what proactive and what reactive techniques to use. TTNP does not make those decisions, but it does determine when to use the application-specified proactive and when to use the application-specified reactive approach. Neither does TTNP decide where to use proactive or where to use reactive approaches to initialize a network or a formal subset of the nodes. That again is in the hands of the applications or systems designer.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for managing and controlling the discovery and maintenance of routes in a mobile ad hoc network comprising a plurality of mobile nodes and a plurality of wireless communication links connecting the mobile nodes together, the method comprising:
   transmitting beacon signals from each mobile node;
   determining a node condition at each mobile node;
   varying the beacon signals based upon the determined node condition;
   building and updating route tables at each mobile node with a first one of proactive and reactive route discovery processes to define routes in the network, a route comprising a set of wireless communication links and mobile nodes from a source to a destination;
   receiving the beacon signals and storing node condition information at each node;
   predicting route stability over time based upon the node condition information; and
   switching to a second one of the proactive and reactive route discovery processes when predicted route stability reaches a first transition parameter.

2. A method according to claim 1 further comprising switching back to the first one of the proactive and reactive route discovery processes when predicted route stability reaches a second transition parameter.

3. A method according to claim 2 wherein the first and second transition parameters specify time-dependent conditions.

4. A method according to claim 1 wherein varying the beacon signal comprises varying at least one of transmission rate, transmission frequency and transmission pattern.

5. A method according to claim 4 wherein the transmission rate of the beacon signal does not exceed a rate threshold based upon available bandwidth.

6. A method according to claim 4 wherein the node condition includes node movement, and varying the beacon signal comprises increasing the transmission rate based upon increased node movement and decreasing the transmission rate based upon decreased node movement.

7. A method according to claim 6 wherein the node movement comprises at least one of node velocity, node acceleration and node movement pattern of the corresponding mobile node.

8. A method according to claim 1 wherein the node condition information is based upon node mobility, link failure, link creation, node stability and link quality.

9. A method according to claim 1 wherein storing node condition information comprises creating and updating a time-dependent route stability profile.

10. A method according to claim 9 wherein storing node condition information further comprises creating and updating a time-dependent route segment stability profile, a segment comprising a set of links and nodes which define a reusable entity in one or more routes.

11. A method for managing and controlling the discovery and maintenance of routes in a mobile ad hoc network comprising a plurality of wireless mobile nodes and a plurality of wireless communication links connecting the mobile nodes together, a group of mobile nodes comprising a temporary or permanent association of at least two of the plurality of mobile nodes, the method comprising:
   transmitting group condition information from at least one of the mobile nodes of the group using a beacon signal;
   determining a group condition of the group of mobile nodes;
   varying the beacon signal based upon the determined group condition;
   building and updating route tables at each mobile node with a first one of proactive and reactive route discovery processes to define routes in the network, a route comprising a set of links and mobile nodes from a source to a destination;
   receiving beacon signals and storing group condition information at each node;
   predicting route stability over time based upon the group condition information; and
   switching to a second one of the proactive and reactive route discovery processes when predicted route stability reaches a first transition parameter.

12. The method according to claim 11 further comprising switching back to the first one of the proactive and reactive route discovery processes when predicted route stability reaches a second transition parameter.

13. The method according to claim 12 wherein the first and second transition parameters specify time-dependent conditions.

14. The method according to claim 11 wherein varying the beacon signal comprises varying at least one of transmission rate, transmission frequency and transmission pattern.

15. The method according to claim 14 wherein the transmission rate of the beacon signal does not exceed a rate threshold based upon available bandwidth.

16. The method according to claim 11 wherein the group condition includes group movement, and varying the beacon signal comprises increasing the transmission rate based upon increased group movement and decreasing the transmission rate based upon decreased group movement.

17. The method according to claim 16 wherein the group movement comprises at least one of group velocity, group acceleration and group movement pattern of the group of mobile nodes.

18. The method according to claim 11 wherein the group condition information is based upon node mobility, link failure, link creation, node stability, group stability and link quality within the group of mobile nodes.

19. The method according to claim 11 wherein storing group condition information comprises creating and updating a time-dependent route stability profile.

20. A method according to claim 19 wherein storing group condition information further comprises creating and updating a time-dependent route segment stability profile, a segment comprising a set of links and nodes which define a reusable entity in one of more routes.

21. A mobile ad hoc network comprising:
a plurality of mobile nodes;
a plurality of wireless communication links connecting the mobile nodes together;
each mobile node comprising
a communications device to wirelessly communicate with other nodes of the plurality of nodes via the wireless communication links, and
a controller to route communications via the communications device, and comprising
a condition determining unit to determine a condition of the mobile node;
a beacon signal generator to generate and transmit beacon signals, the beacon signal generator varying the beacon signals based upon the determined condition of the mobile node,
route tables to define routes in the network, a route comprising a set of wireless communication links and mobile nodes from a source to a destination,
a route discovery module to discover routes and update the route tables with one of a plurality of route discovery processes,
a condition module to receive beacon signals and store node condition information,
a route stability predictor to predict route stability over time based upon the node condition information, and
a route discovery process selector to select between the plurality of route discovery processes based upon the predicted route stability.

22. The network according to claim 21 wherein the plurality of route discovery processes include proactive and reactive route discovery processes; and wherein the route discovery process selector selects the proactive route discovery process when the predicted route stability reaches a first transition parameter, and selects the reactive route discovery process when predicted route stability reaches a second transition parameter.

23. The network according to claim 22 wherein the first and second transition parameters comprise time-dependent conditions.

24. The network according to claim 21 wherein the plurality of route discovery processes include proactive and reactive route discovery processes; and wherein the route discovery process selector selects the reactive route discovery process when the predicted route stability reaches a first transition parameter, and selects the proactive route discovery process when predicted route stability reaches a second transition parameter.

25. The network according to claim 24 wherein the first and second transition parameters comprise time-dependent conditions.

26. The network according to claim 21 wherein the beacon signal generator varies the beacon signal by varying at least one of transmission rate, transmission frequency and transmission pattern.

27. The network according to claim 26 wherein the node condition includes node movement, and the beacon signal generator varies the beacon signal by increasing the transmission rate based upon increased node movement and decreasing the transmission rate based upon decreased node movement.

28. The network according to claim 27 wherein the node movement comprises at least one of node velocity, node acceleration and node movement pattern of the corresponding mobile node.

29. The network according to claim 21 wherein the beacon signal further includes information relating to a condition of a group of mobile nodes, the group of mobile nodes comprising a temporary or permanent association of at least two of the plurality of mobile nodes; wherein the condition determining unit further determines a condition of the group of mobile nodes; and wherein the beacon signal generator varies the beacon signal based upon the determined condition of the group of mobile nodes.

30. The network according to claim 29 wherein the group condition includes group movement, and the beacon signal generator varies the beacon signal comprises by increasing the transmission rate based upon increased group movement and by decreasing the transmission rate based upon decreased group movement.

31. The network according to claim 30 wherein the group movement comprises at least one of group velocity, group acceleration and group movement pattern of the group of mobile nodes.

32. The network according to claim 29 wherein the group condition information is based upon node mobility, link failure, link creation, node stability, group stability and link quality within the group of mobile nodes.

33. The network according to claim 21 wherein the node condition information is based upon node mobility, link failure, link creation, node stability, and link quality.

34. A network according to claim 21 wherein the condition module comprises a time-dependent route stability profile.

35. A network according to claim 21 wherein the condition module comprises a time-dependent route segment stability profile, a route segment comprising a set of links and nodes which define a reusable entity in each of a plurality of routes.

* * * * *

UNITED STATES PATENT AND TRADEMARK OFFICE
CERTIFICATE OF CORRECTION

PATENT NO. : 6,763,014 B2
DATED : July 13, 2004
INVENTOR(S) : Robert A. Kennedy

It is certified that error appears in the above-identified patent and that said Letters Patent is hereby corrected as shown below:

<u>Title Page,</u>
Item [57], ABSTRACT,
Line 8, delete "bulit" insert -- built --

<u>Column 2,</u>
Line 55, delete "bulit" insert -- built --

<u>Column 3,</u>
Line 27, delete "include" insert -- includes --

<u>Column 4,</u>
Line 46, delete "neigbor" insert -- neighbor --

<u>Column 6,</u>
Line 7, delete "would be" insert -- would --
Line 19, delete "transmiting" insert -- transmitting --

Signed and Sealed this

First Day of February, 2005

JON W. DUDAS
*Director of the United States Patent and Trademark Office*